Dec. 20, 1966  D. L. COLE  3,292,523
COOLING MEANS FOR BLOWER MOTOR
Filed Sept. 13, 1965
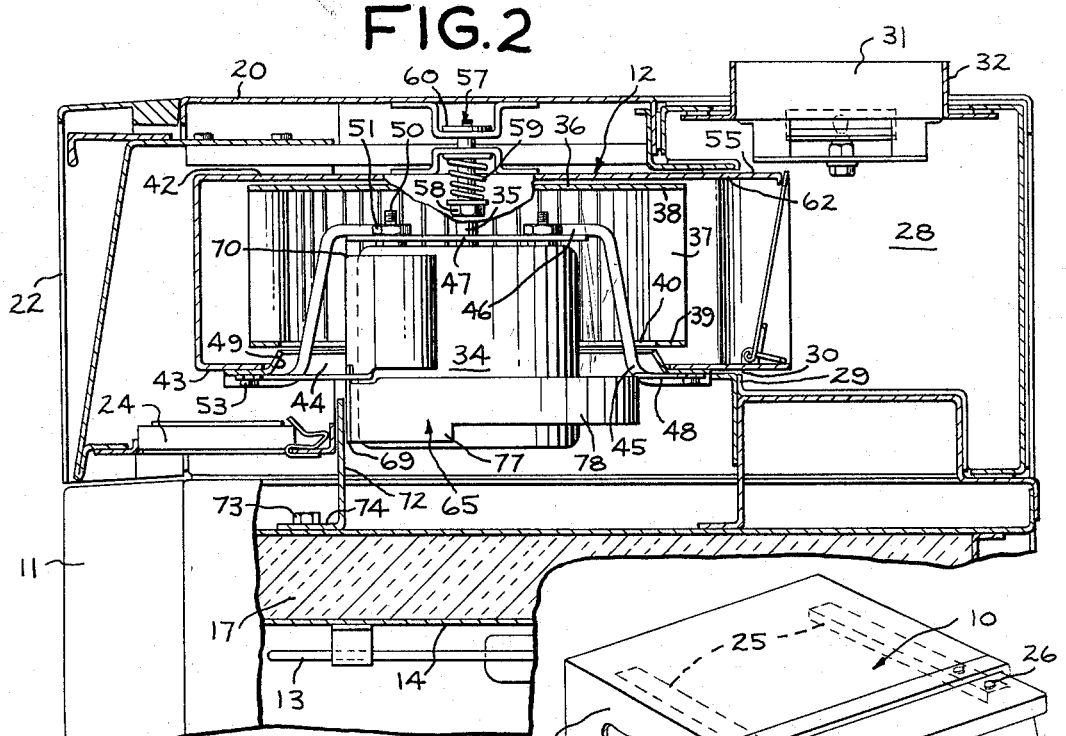
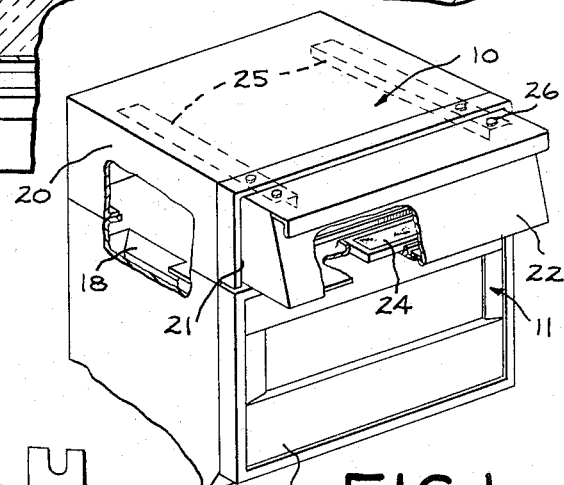
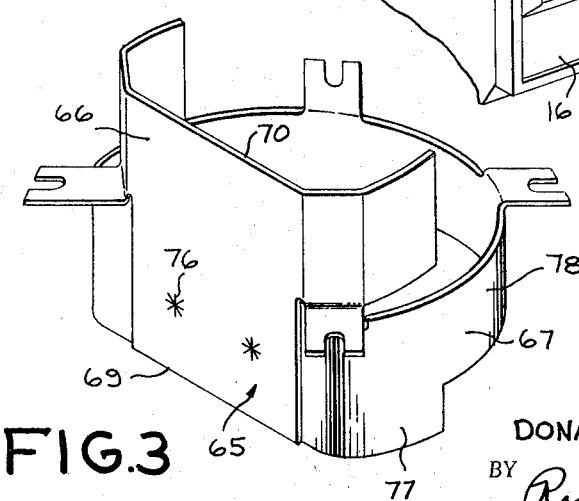
INVENTOR.
DONALD L. COLE
BY Richard L. Caelin
HIS ATTORNEY

United States Patent Office 3,292,523
Patented Dec. 20, 1966

3,292,523
COOLING MEANS FOR BLOWER MOTOR
Donald L. Cole, Finchville, Ky., assignor to General
Electric Company, a corporation of New York
Filed Sept. 13, 1965, Ser. No. 486,928
3 Claims. (Cl. 98—115)

The present invention relates to a means for cooling the motor of a motor-blower unit and particularly when such unit is installed in a kitchen ventilating hood for handling hot air.

Ventilating hoods are commonly installed over kitchen ranges or assembled over built-in wall ovens or eye-level ovens. In such instances they handle grease and vapor-laden hot air formed during various cooking operations so that the air must first be filtered before reaching the motor-blower unit and being exhausted to the outside of the kitchen. Every electric motor experiences an increase in temperature while it is operating. This elevated temperature condition becomes a more critical consideration when the motor is placed in an environment where the temperature of the air being handled by the blower is also elevated above normal room temperature. Extreme temperatures tend to shorten the expected life of the motor and render some motor designs unacceptable for such application, mainly because of the inability of the motor coil insulation to withstand such degrees of temperature without causing electrical failures.

The principal object of the present invention is to provide the motor of a motor-blower unit with a combined heat shield and cooling device for protecting the motor from exposure to hot gases while taking advantage of a supply of relatively cool air for cooling the motor housing.

A further object of the present invention is to provide the motor of a motor-blower unit with a heat shielding means at one side for protecting the motor from hot gases being handled by the blower, as well as a cooling device in the blower air inlet for directing relatively cool air over the remaining sides of the motor housing.

The present invention, in accordance with one form thereof, is embodied in a motor-blower unit for use in a hot air stream where the motor is furnished with a combined heat shield and cooling device surrounding the motor and having a shielding plate adjacent one side of the motor facing toward the direction of the source of hot gases. Cooperating with the shielding plate is a semi-circular collar located in the blower air inlet to encircle the remaining sides of the motor to permit some relatively cool air to be drawn under the collar and into contact with the motor while other cool air passes over the collar and is drawn into the blower.

My invention will be better understood from the following description taken in conjunction with the accompanying drawing and its scope will be pointed out in the appended claims.

FIGURE 1 is a perspective view of an eye-level oven having installed on the top thereof a ventilating hood that is to embody the motor-blower unit having the motor cooling means of the present invention;

FIGURE 2 is a right-side, cross-sectional, elevational view of the top portion of the oven of FIGURE 1 and the ventilating hood mounted on the top thereof, and showing in detail the combined heat shield and cooling device furnished around the motor; and FIGURE 3 is a perspective view on a larger scale showing the combined heat shield and cooling device removed from the motor so as to be able to identify its over-all configuration.

Turning now to a consideration of the drawing and in particular to FIGURE 1, there is shown a kitchen ventilating hood 10 assembled on top of an eye-level electric oven 11. Although this hood is shown as an integral part of the oven it should be appreciated by those skilled in this art that the cooling means for the motor of the motor-blower unit 12 of FIGURE 2 has general utility in the art of air handling devices.

The particular oven 11 shown is an electric oven having at least one resistance heating element 13 supported adjacent the top wall of a box-like oven liner 14 as is seen in FIGURE 2. A cooking cavity is formed by providing an oven door 16 for the front of the oven liner 14. Thermal insulation 17 surrounds the oven liner for retaining within the oven cavity much of the heat generated by the heating means. Usually this type of eye-level oven 11 is mounted over a top cooking surface having a plurality of surface heating elements (not shown). Accordingly the oven is designed with vertical air channels 18 shown in the side walls of the oven in FIGURE 1 and leading from the underside of the oven on the outside of the insulation 17 so that air from the cooking surface may be drawn by the motor-blower unit 12 into the hood 10 and from there to be exhausted from the kitchen.

The ventilating hood 10 comprises a box-like metal shell 20 with an open bottom wall for encompassing the top of the oven 11, and an open front wall 21 which is adapted to be closed by a movable shutter 22 as seen in FIGURE 1. This shutter is capable of sliding movement between a closed position within the hood shell as is shown in FIGURE 2 and an open position as shown in FIGURE 1. This movable shutter 22 is, in effect a box-like structure with an open back wall and a bottom wall having a grease filter 24 mounted over an opening formed therein for receiving air rising from the oven cavity when the oven door is left slightly ajar, as during broiling operations. When it is desirable to draw air only from beneath the oven, the shutter 22 is closed and the suction of the motor-blower unit 12 draws air up the air channels 18 at the two sides of the oven liner. The shutter 22 is supported on a pair of side rails 25 that are slidably mounted beneath the top portion of the hood shell 20. The top wall of the shutter 22 is provided with suitable openings for receiving fastening screws 26 therethrough which are joined to the rails 25. Hence, it will be understood that it is an easy matter to remove the shutter from the rails 25 for opening the front of the hood and gaining access to the interior of the hood shell 20.

Looking at FIGURE 2, the rear of the hood shell 20 has walls forming a plenum chamber 28. A transverse wall 29 has an air inlet opening 30 for the plenum chamber. An air outlet opening 31 leading from the plenum chamber 28 is shown in the top wall of the hood shell, but it could just as well be located in the back wall. A transition collar 32 is mounted in the air outlet opening 31 and it is adjustably mounted in a horizontal plane so that it may be shifted for making a mating engagement with exhaust ducting formed up through the kitchen cabinet or back through the kitchen wall, as the case may be. This plenum chamber design is not described in greater detail for it does not form part of the present invention as it is claimed in a copending application Serial No. 486,929 entitled "Exhaust Duct Connection for Ventilating Hood" which was filed concurrently herewith.

The motor-blower unit 12 comprises an electric motor 34 having a vertical shaft 35 extending from the top thereof and on which is mounted a blower wheel 36. As is conventional in this art, the blower wheel comprises a plurality of spaced vanes 37 fastened between an imperforate top end wall 38 and a bottom annular end wall 39. This annular end wall 39 has a large, central air inlet opening 40 for receiving the motor 34 therethrough so that about one-half of the motor extends into the center of the blower wheel 36. This opening 40 is larger than the diameter of the motor so as to constitute an annular air inlet opening around the outside of the motor. In order to gain the best aerodynamic efficiency and performance, a scroll-shaped blower housing 42 encompasses the blower wheel and hence the top portion of the motor. A bottom wall 43 of the blower housing, which is adjacent the bottom wall 39 of the blower wheel, is also provided with an enlarged central opening 44 to serve as an annular, air inlet opening that generally coincides with the air inlet opening 40 of the blower wheel.

Suitable radially spaced straps 45 are employed to support the motor 34 from the blower housing 42. These straps are of generally V-shape having an inwardly directed top leg 46 welded to a motor and ring 47, and an outwardly directed bottom leg 48 welded to a housing end ring 49. The housing of the motor 34 is provided with a series of vertical studs 50 on the top end thereof making a fastening connection with the end ring 47 by using fastening nuts 51. Moreover, the larger, bottom end ring 49 is fastened to the bottom wall of the blower housing 42 by means of fastening screws 53.

Looking at FIGURE 2, it will be clear that there is a telescopic engagement between the air inlet opening 30 of the plenum chamber 28 and an air exhaust duct 55 of the blower housing 42. This exhaust duct 55 in a scroll-shaped configuration is a tangential duct of generally rectangular transverse cross-section which emanates from the periphery of the blower wheel in a direction which follows the direction of rotation of the blower wheel 36. The air inlet opening 30 of the plenum chamber is slightly larger than the transverse cross-section of the exhaust duct 55 of the blower housing so that under normal operating conditions the duct 82 is free floating within the air inlet opening 30.

The motor-blower unit 12 is suspended in the hood shell 20 by means of a pair of resilient fastening means 57 each formed by a bolt 58, coil spring 59 and an enlarged cap 60 on the top end of the bolt. This mounting means is not described here in greater detail because it does not form part of the present invention as it is described and claimed in my copending application Serial No. 486,930 which was filed concurrently herewith and entitled "Mounting Means for Motor-Blower Unit." In the event of abnormal vibration conditions which might cause the motor-blower unit 12 to swing from the unit mounting means 57, suitable felt cushions 62 are positioned within the throat of the air inlet opening 30 of the plenum chamber 28 so as to absorb the impact of the exhaust duct 55.

The above information has been given mainly as background information to describe the environment in which the present invention of a cooling means for the motor 34 is associated. This cooling means is positioned around the bottom portion of the motor and is identified in FIGURE 2 as element 65. This cooling means 65 may be considered as comprising two elements, first, a heat shield 66 vertically positioned at one side of the motor closely adjacent thereto, and secondly a semi-circular collar 67 encircling the remaining sides of the motor adjacent the lower portion thereof and just outside the blower housing inlet opening 44, as is best seen in FIGURE 2. The heat shield 66 is positioned on the front side of the motor 34 facing the front opening 21 in the hood shell through which the hot oven gases enter the hood shell and are drawn into the blower unit. The heat shield 66 has a bottom edge 69 that is located adjacent the bottom wall of the motor and a top edge 70 located adjacent the top wall of the motor. An air deflector plate 72 of generally L-shaped configuration is adapted to be fastened to the top of the oven by means of a fastening screw 73 and flange 74. This deflector tends to discourage the hot air flow from passing under the motor 34 so that the incoming hot air is directed upwardly into the blower wheel 36. Thus, there is a tendency for the hot air to be deflected away from the motor by the heat shield 66 and be drawn upwardly by the suction of the blower wheel 36.

As is best seen in the perspective view of the cooling means 65 in FIGURE 3, the collar 67 is a semi-circular configuration that is supported from the heat shield 66 and adapted to encircle the three remaining sides of the motor in a location adjacent the lower portion thereof and just to the outside of the air inlet opening 44 in the bottom wall of the blower housing 42. For ease of manufacture, this collar 67 is welded or otherwise permanently fastened to the heat shield 66 as at weld points 76. The collar 67 is slightly higher at the front near the heat shield 66 as in the area identified by reference numeral 77, while the remaining portion of the collar is of reduced height as at 78.

The air rising up the air channels 18 in the oven is relatively cooler than the hot gases entering the hood shell through the filter 24 in the shutter 22. This cooler air is drawn upwardly toward the blower wheel 36 and its stream divides a portion passing under the lower edge of the collar 67 while the remaining portion passes over the outside of the collar. The portion of the cool air passing under the collar 67 is in direct contact with the housing of the motor 34 and it has a relatively high velocity. A high rate of heat transfer occurs in this turbulent region as the rapidly moving air passes over the motor housing. The portion of the cool air passing over the collar 67 is of generally lower velocity and it tends to be drawn up into the blower wheel by the higher velocity air from beneath the collar.

Modifications of this invention will occur to those skilled in this art therefore it is to be understood that this invention is not limited to the particular embodiments disclosed, but that it is intended to cover all modifications which are within the true spirit and scope of this invention as claimed.

What I claim as new and desire to secure by Letters Patent of the United States is:

1. A blower unit for use in a hot air stream comprising a motor and blower wheel as well as a housing surrounding the blower wheel, one wall of the housing having an air inlet opening while a different wall of the housing has an air outlet opening, the motor being positioned within the air inlet opening and partially within the blower wheel; the invention comprising a combined heat shield and cooling device surrounding the motor and having a shielding plate positioned closely adjacent one side of the motor for substantially the height thereof so as to deflect hot gases away from the motor as they are drawn into the blower wheel, the cooling device comprising a narrow collar of semi-circular shape encircling the remaining sides of the motor in the vicinity of the said air inlet opening, the said collar being spaced away from the motor to permit relatively high velocity cool air to pass under the collar and into direct turbulent contact with the motor for a high rate of heat transfer, while relatively low velocity cool air passes over the collar and is drawn into the blower wheel by the said high velocity cool air.

2. A blower unit for use in a ventilating hood comprising a motor and blower wheel as well as a scroll-shaped housing surrounding the blower wheel, a bottom wall of the housing having a large air inlet opening, while a side wall of the housing has a tangentially arranged air outlet duct, the said motor being vertically arranged within the air inlet opening and extending partially within the blower wheel, and strap means for supporting the motor from the housing, a combined heat shield and cooling device supported from the housing and surrounding the motor with a shielding plate positioned adjacent the front side of the motor and extending for substantially the height of the motor, the shielding plate serving to deflect hot air away from the motor as it is drawn up into the blower wheel, the cooling device being a narrow semi-circular collar positioned within the mouth of the air inlet opening and spaced away from the remaining sides of the motor to direct relatively cool air under the collar and into direct heat transfer relation with the lower portion of the motor.

housing and thereby cooling the lower portion of the motor.

3. A kitchen ventilating hood comprising a hood shell with a front-mounted shutter that is movable between an open and a closed position, a blower unit mounted within the hood shell and comprising a vertically arranged motor and blower wheel assembly as well as a scroll-shaped housing surrounding the blower wheel, the bottom wall of the housing having a large air inlet opening, the motor being positioned within the air inlet opening and partially within the blower wheel, a metal shield positioned closely adajcent the front side of the motor for substantially the height thereof so as to deflect hot air away from the motor as the air is drawn into the blower wheel, a narrow cooling ring supported from the metal shield and encircling the lower portion of the three remaining sides of the motor in the area just outside of the air inlet opening, the hood shell including a source of relatively cool air adjacent the sides and rear of the shell, said cool air being adapted to pass both under and around the cooling ring for dissipating some of the heat created by the operation of the motor.

References Cited by the Examiner
UNITED STATES PATENTS

| | | | |
|---|---|---|---|
| 2,604,500 | 7/1952 | Koning | 310—52 |
| 2,852,594 | 9/1958 | Amand | 165—185 |
| 2,853,279 | 9/1958 | Switzer | 165—134 |
| 2,933,292 | 4/1960 | Chislow | 165—80 |
| 3,174,463 | 3/1965 | Reagan | 122—4 |

ROBERT A. O'LEARY, *Primary Examiner.*

M. A. ANTONAKAS, *Assistant Examiner.*